(12) United States Patent
Kobayashi et al.

(10) Patent No.: US 12,449,318 B2
(45) Date of Patent: Oct. 21, 2025

(54) TORQUE MEASURING DEVICE

(71) Applicants: NSK LTD., Tokyo (JP); Proterial, Ltd., Tokyo (JP)

(72) Inventors: Masahiro Kobayashi, Fukuroi (JP); Kota Fukuda, Fukuroi (JP); Hisayoshi Fukui, Fukuroi (JP); Takahiro Odera, Fukuroi (JP); Akitoshi Fujimori, Koto-ku (JP); Takashi Onimoto, Koto-ku (JP); Yiming Jin, Koto-ku (JP)

(73) Assignees: NSK LTD., Tokyo (JP); PROTERIAL, LTD., Tokyo (JP)

( * ) Notice: Subject to any disclaimer, the term of this patent is extended or adjusted under 35 U.S.C. 154(b) by 375 days.

(21) Appl. No.: 18/176,052

(22) Filed: Feb. 28, 2023

(65) Prior Publication Data

US 2023/0280219 A1    Sep. 7, 2023

(30) Foreign Application Priority Data

Mar. 1, 2022 (JP) .................. 2022-031027

(51) Int. Cl.
 *G01L 1/12* (2006.01)
 *G01L 5/13* (2006.01)
(52) U.S. Cl.
 CPC .............. *G01L 1/125* (2013.01); *G01L 5/136* (2013.01)
(58) Field of Classification Search
 CPC .................... G01L 1/125; G01L 5/136
 See application file for complete search history.

(56) References Cited

U.S. PATENT DOCUMENTS 7,454,998 B1 * 11/2008 Hsieh .................. B25B 13/06
 81/185
2006/0179959 A1 * 8/2006 Ouyang ................ G01L 3/102
 73/862.331

(Continued)

FOREIGN PATENT DOCUMENTS

JP    4-62444 A    2/1992
JP    9-105686 A    4/1997

(Continued)

OTHER PUBLICATIONS

Office Action issued Sep. 9, 2025 in Japanese Application No. 2022-031027.

*Primary Examiner* — Herbert K Roberts
(74) *Attorney, Agent, or Firm* — Sughrue Mion, PLLC

(57) ABSTRACT

The torque measuring device includes: a casing made of a magnetic metal; a rotating shaft rotatably arranged inside the casing and having a magnetostrictive effect section whose magnetic permeability changes according to torque to be transmitted; and a torque sensor arranged around the magnetostrictive effect section and supported by the casing, the torque sensor including a coil unit formed in a cylindrical shape using a flexible substrate having a detection coil that changes voltage in response to changes in the magnetic permeability of the magnetostrictive effect section, and a holder made of rubber or synthetic resin, covering an outer peripheral surface of the coil unit, and having a portion that protrudes from the coil unit on both sides in an axial direction; and the torque sensor supported by the casing with an outer peripheral surface of the holder fitted into an inner peripheral surface of the casing.

8 Claims, 13 Drawing Sheets

(56) References Cited

U.S. PATENT DOCUMENTS

2016/0305833 A1    10/2016  Nakamura
2022/0202366 A1*    6/2022  Mitchell ................... C08F 2/48
2024/0230574 A1*    7/2024  Berry ................... G01N 27/226

FOREIGN PATENT DOCUMENTS

| JP | 2004245619 A | * | 9/2004 |
| JP | 2016-200552 A | | 12/2016 |
| JP | 2017-049124 A | | 3/2017 |

* cited by examiner

FIG. 11
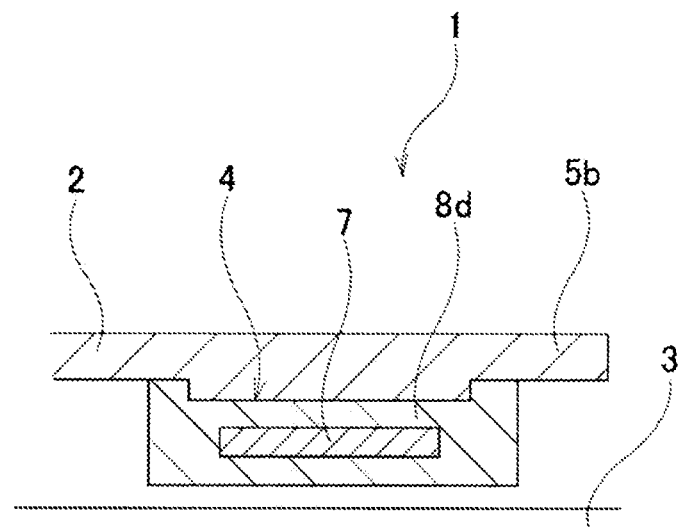
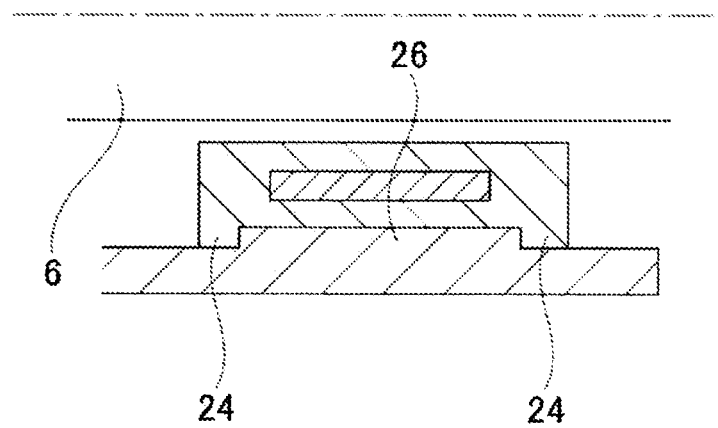

FIG. 12
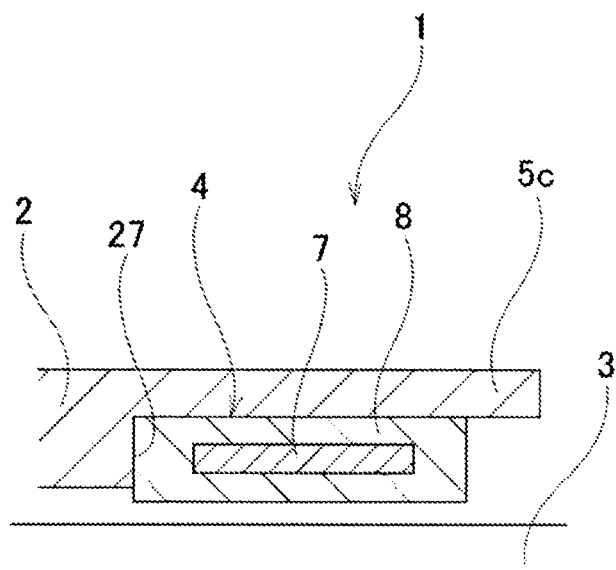
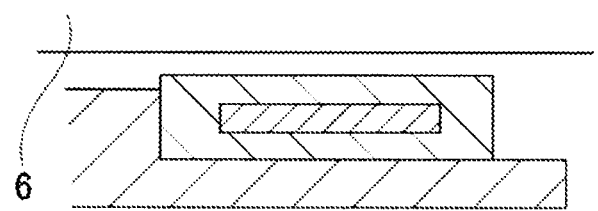

TORQUE MEASURING DEVICE

CROSS REFERENCE TO RELATED APPLICATIONS

This patent application claims the benefit of JP Patent Application No. 2022-031027 filed Mar. 1, 2022. The above application is incorporated by reference herein.

FIELD

The present disclosure relates to a torque measuring device capable of measuring torque.

BACKGROUND

In recent years, in the field of automobiles, the development of systems that measure torque transmitted by a rotating shaft of a power train, or in other words, a power transmission mechanism, use the measurement results to control output of an engine or an electric motor that is a power source, and execute speed change control of a transmission is advancing.

Conventionally, a magnetostrictive torque measuring method is known as a method for measuring torque transmitted by a rotating shaft. In the magnetostrictive torque measuring method, a magnetostrictive effect section is provided at a portion in the axial direction of a rotating shaft, and a torque sensor for detecting a change in magnetic permeability of the magnetostrictive effect section is arranged near the magnetostrictive effect section. When torque is applied to the rotating shaft and elastic torsional deformation occurs in the magnetostrictive effect section, the magnetic permeability of the magnetostrictive effect section changes based on an inverse magnetostrictive effect. As a result, an output signal of the torque sensor changes in accordance with the change in magnetic permeability of the magnetostrictive effect section, and thus torque transmitted by the rotating shaft can be measured.

For example, JP 2016-200552 A and JP 2017-049124 A describe a specific structure of a magnetostrictive torque sensor. The torque sensors described in these publications include a coil unit and a back yoke.

The coil unit has a cylindrical shape and is arranged around the magnetostrictive effect section of the rotating shaft. The coil unit has a detection coil that changes voltage in response to changes in magnetic permeability of the magnetostrictive effect section. The back yoke is a member that serves as a magnetic path for a magnetic field generated by the detection coil, is made of a magnetic material and has a cylindrical shape, and is arranged around the coil unit.

With a torque sensor having such a configuration, the torque transmitted by the rotating shaft can be measured based on the voltage of the detection coil. In addition, since the back yoke is arranged around the coil unit, leakage of magnetic flux to the outside is suppressed, an effect of disturbance becomes less likely, and accuracy of torque measurement can be improved.

SUMMARY

In recent years, in order to reduce the thickness of a magnetostrictive torque sensor, it has been considered to form a cylindrical coil unit from a flexible substrate having a detection coil. In such a torque sensor as well, arranging the back yoke around the coil unit is effective from the aspect of improving accuracy of torque measurement.

However, when a configuration is adopted in which the coil unit, which is formed in a cylindrical shape using a flexible substrate, is directly adhered to the inner peripheral surface of the back yoke, there is a possibility that during assembly work, the coil unit may collide with surrounding objects and be damaged before being adhered.

In addition, when the torque sensor supported by the support member during use includes a back yoke as a single component that only serves as a magnetic path, the number of parts increases, which causes an increase in manufacturing cost.

An object of the present disclosure is to provide a torque measuring device in which a coil unit is less likely to be damaged during assembly work and in which the number of parts can be reduced.

The torque measuring device according to an aspect of the present disclosure includes a casing, a rotating shaft, and a torque sensor.

The casing is made of magnetic metal.

The rotating shaft is rotatably arranged inside the casing, and has a magnetostrictive effect section whose magnetic permeability changes according to torque to be transmitted.

The torque sensor is arranged around the magnetostrictive effect section and supported by the casing.

The torque sensor includes a coil unit formed in a cylindrical shape using a flexible substrate having a detection coil that changes voltage in response to changes in the magnetic permeability of the magnetostrictive effect section, and a holder made of rubber or synthetic resin that covers an outer peripheral surface of the coil unit and having portions that protrude toward both sides in the axial direction than the coil unit.

The torque sensor, in a state with an outer peripheral surface of the holder fitted into an inner peripheral surface of the casing, is supported by the casing.

In the torque measuring device according to an aspect of the present disclosure, the holder includes portions that cover side surfaces on both side in the axial direction of the coil unit.

In the torque measuring device according to an aspect of the present disclosure, the coil unit is entirely embedded in the holder.

In the torque measuring device according to an aspect of the present disclosure, a ridge provided on the outer peripheral surface of the holder is engaged with a circumferential groove provided on the inner peripheral surface of the casing.

In the torque measuring device according to an aspect of the present disclosure, an outward facing flange portion provided on the holder abuts against a side surface in the axial direction of the casing.

In the torque measuring device according to an aspect of the present disclosure, a portion of the casing is sandwiched from both sides in the axial direction by two outward facing flange portions provided on the holder.

In the torque measuring device according to an aspect of the present disclosure, the holder is abutted against a stepped surface facing in the axial direction and provided on the inner peripheral surface of the casing.

In the torque measuring device according to an aspect of the present disclosure, the holder is sandwiched from both sides in the axial direction between a stepped surface facing in the axial direction provided on the inner peripheral surface of the casing and an inward facing flange portion provided on the casing.

With the torque measuring device according to an aspect of the present disclosure, the coil unit is less likely to be damaged during assembly work, and the number of parts can be reduced.

BRIEF DESCRIPTION OF THE DRAWINGS

To assist those of ordinary skill in the relevant art in making and using the Subject matter hereof, reference is made to the appended drawings, in which like reference numerals refer to similar elements.

FIG. 11 is a cross-sectional view of a torque measuring device according to a fifth example of an embodiment of the present disclosure.

FIG. 12 is a cross-sectional view of a torque measuring device according to a sixth example of an embodiment of the present disclosure.

It should be understood that the drawings are not to scale and that the disclosed embodiments are sometimes illustrated diagrammatically and in partial views. In certain instances, details that are not necessary for an understanding of the disclosed method and apparatus, or that would render other details difficult to perceive may have been omitted. It should be understood that this disclosure is not limited to the particular embodiments illustrated herein.

DETAILED DESCRIPTION

In the following detailed description of some embodiments, reference is made to the accompanying drawings, which form a part hereof, and within which are shown by way of illustration specific embodiments by which the disclosure may be practiced. It is to be understood that other embodiments may be utilized, and structural changes may be made without departing from the scope of the disclosure.

First Example

A first example of an embodiment of the present disclosure will be described with reference to FIGS. 1 to 6.

A torque measuring device 1 of this example includes a casing 2, a rotating shaft 3, and a torque sensor 4. The torque measuring device 1 is capable of measuring torque transmitted by the rotating shaft 3, and is applicable to various mechanical devices. Specific examples of applicable mechanical devices include: a mechanical device of a power train of an automobile, for example, a transmission such as an automatic transmission (AT), a belt-type continuously variable transmission, a toroidal type continuously variable transmission, an automatic manual transmission (AMT), a dual clutch transmission (DCT) and the like that performs gear shifting that is controlled on the vehicle side; or a transfer, a manual transmission (MT), or the like. The driving system of the target vehicle is not particularly limited and may be FF, FR, MR, RR, 4WD, or the like.

Specific examples of the other mechanical device incorporating the torque measuring device 1 of the present example include devices that change a rotation speed of a power shaft with gears such as a speed reducer or a speed increaser of a wind turbine, a railway vehicle, a rolling mill for steel, and the like.

Figure 1:
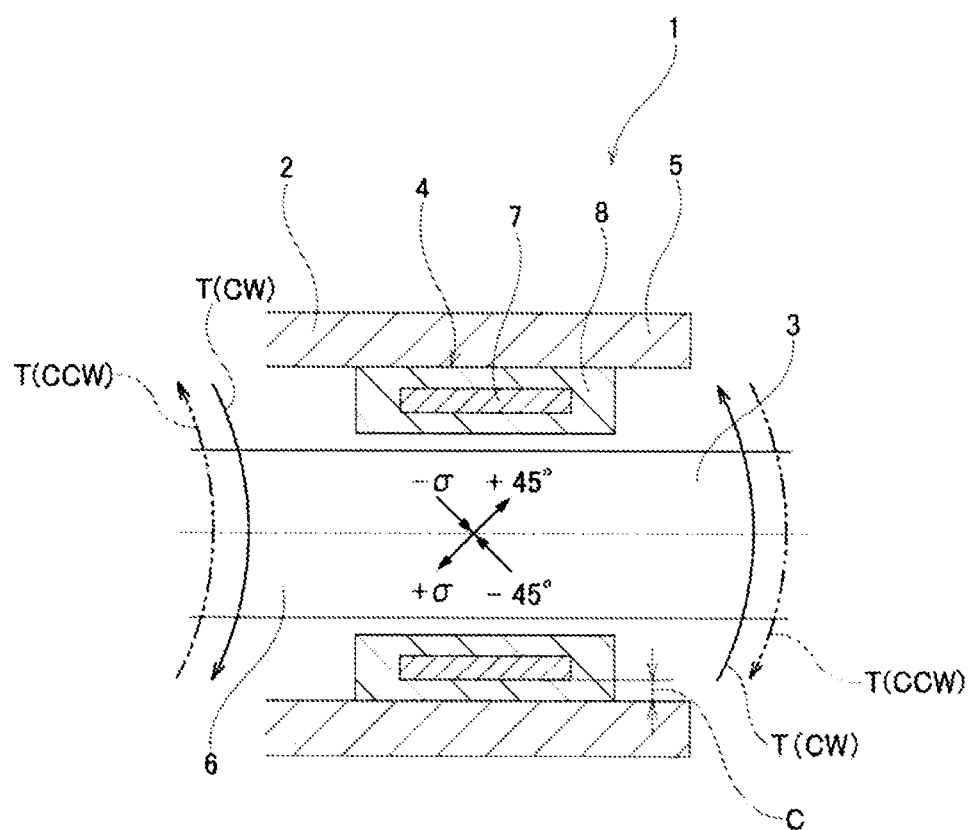
FIG. 1 is a cross-sectional view of a torque measuring device according to a first example of an embodiment of the present disclosure.

In the torque measuring device 1 of this example, the casing 2 is an exterior member such as a casing, housing, cover, etc. of a mechanical device that constitutes the power train of an automobile, and is made of magnetic metal such as iron alloy. In this example, the casing 2 has a tubular portion 5 having a cylindrical shape as illustrated in FIG. 1.

In this example, the rotating shaft 3 is a torque transmission shaft of a mechanical device that constitutes the power train of an automobile, and has a magnetostrictive effect section whose magnetic permeability changes according to the torque to be transmitted. The rotating shaft 3 is rotatably supported by a rolling bearing (not illustrated) at a portion (not illustrated) of the casing 2.

The rotating shaft 3 has an intermediate shaft portion 6 arranged coaxially with the tubular portion 5 inside the tubular portion 5 of the casing 2. An outer peripheral surface of the intermediate shaft portion 6 is configured by a cylindrical surface. In the present example, the intermediate shaft portion 6 of the rotating shaft 3 functions as the magnetostrictive effect section. For this reason, the rotating shaft 3 is made of magnetic metal. As the magnetic metal forming the rotating shaft 3, various magnetic steels can be used such as carburized steel such as SCr420 and SCM420, and carbon steel such as S45C, which are defined in the Japanese Industrial Standards (JIS).

When a torque is applied to the rotating shaft 3 and the intermediate shaft portion 6 is torsionally deformed, the intermediate shaft portion 6 is subjected to a stress corresponding to the torque, that is, a tensile stress acts in the +45° direction with respect to the axial direction and a compressive stress acts in the −45° direction with respect to the axial direction. As this occurs, the magnetic permeability in each direction of the intermediate shaft portion 6 changes due to an inverse magnetostriction effect.

When carrying out the present disclosure, it is possible to improve the mechanical and magnetic properties of a portion of the outer peripheral surface of the intermediate shaft portion 6 that faces the torque sensor 4 by subjecting the portion to a shot peening process to form a compression work hardened layer. In this way, sensitivity and hysteresis of torque measurement by the torque measuring device 1 may be improved.

When carrying out the present disclosure, instead of having the intermediate shaft portion 6 function as the magnetostrictive effect section, it is also possible to fix a magnetostrictive material functioning as the magnetostrictive effect section to an outer peripheral surface of the intermediate shaft portion 6. More specifically, an annular-shaped magnetostrictive material may be externally fitted around the intermediate shaft portion 6 and fixed, or a magnetostrictive material composed of a film coating such as plating or a film-like magnetostrictive material may be externally fixed to the outer peripheral surface of the intermediate shaft portion 6.

In this example, the torque sensor 4 has a cylindrical shape as a whole, is arranged around the intermediate shaft portion 6 of the rotating shaft 3, and is internally fitted and supported by the tubular portion 5 of the casing 2. The torque sensor 4 includes a coil unit 7 and a holder 8. The torque sensor 4 does not include a back yoke.

The coil unit 7 is configured by a flexible substrate (FPC) 10 including a base film and printed wiring (conductors) held by the base film. The flexible substrate 10 has a detection coil 9 that changes voltage in response to changes in magnetic permeability of the intermediate shaft portion 6.

Figure 2A:
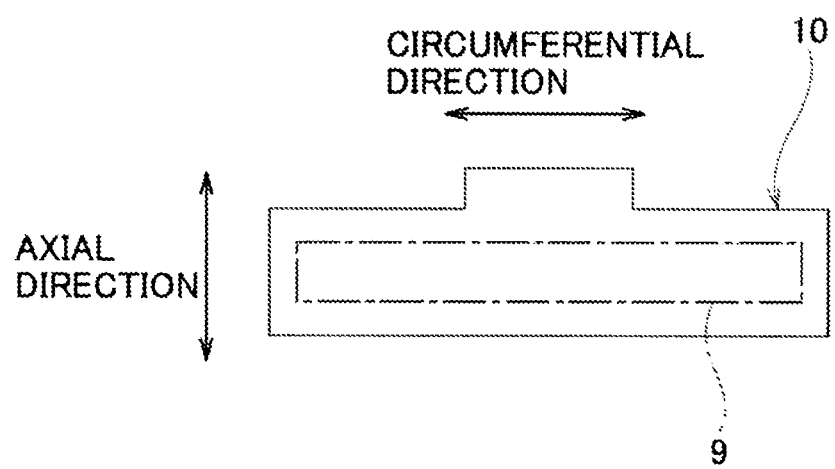
FIG. 2A is a developed view of a flexible substrate of a coil unit of the first example.
Figure 2B:
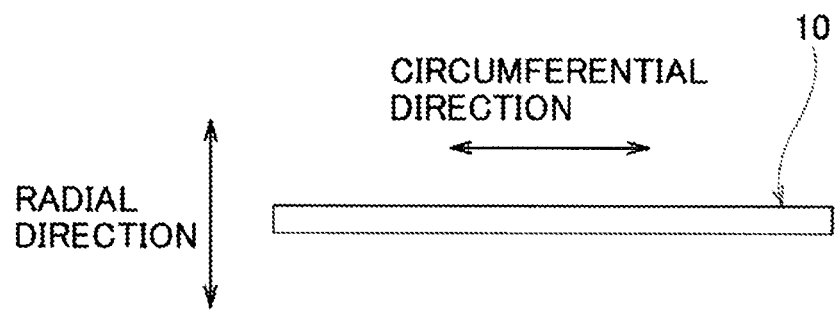
FIG. 2B is a view as seen from below the flexible substrate in FIG. 2A.

More specifically, in this example, the coil unit 7 is formed by rolling the band-shaped flexible substrate 10 as illustrated in FIG. 2 into a cylindrical shape, and by bonding together, for example, both end portions in the length direction of the flexible substrate 10.

In this example, the detection coil 9 includes a first split coil 11, a second split coil 12, a third split coil 13, and a fourth split coil 14 provided on the flexible substrate 10. That is, the flexible substrate 10 has four wiring layers that are layered in the substrate thickness direction, and the first split coil 11, the second split coil 12, the third split coil 132, and the fourth split coil 14, each of which is configured by printed wiring, are arranged on these wiring layers.

In a state in which the band-shaped flexible substrate 10 is rolled into a cylindrical shape, that is, in a state that the cylindrical coil unit 7 is formed, the first split coil 11, the second split coil 12, the third split coil 13, and the fourth split coil 14 are arranged in order from the inner side in the radial direction.

Figure 3:
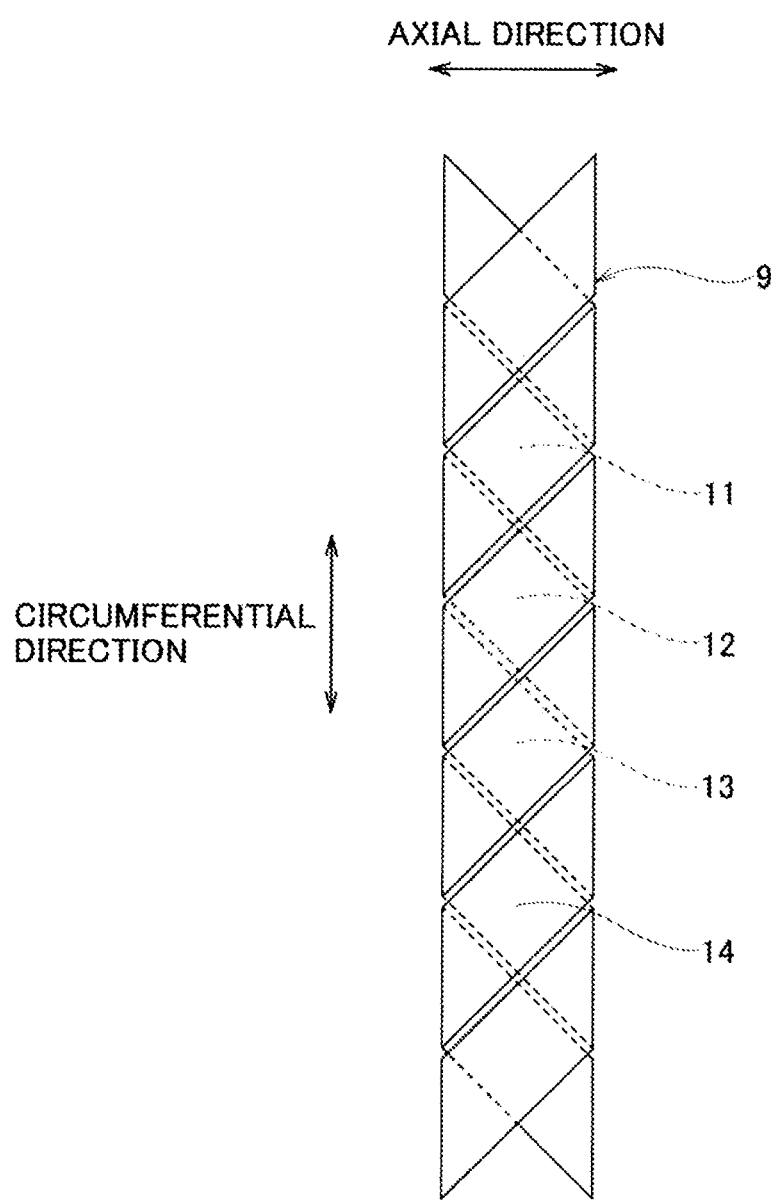
FIG. 3 is a developed view of a detection coil of the coil unit of the first example as seen from outside in a radial direction.
Figure 4:
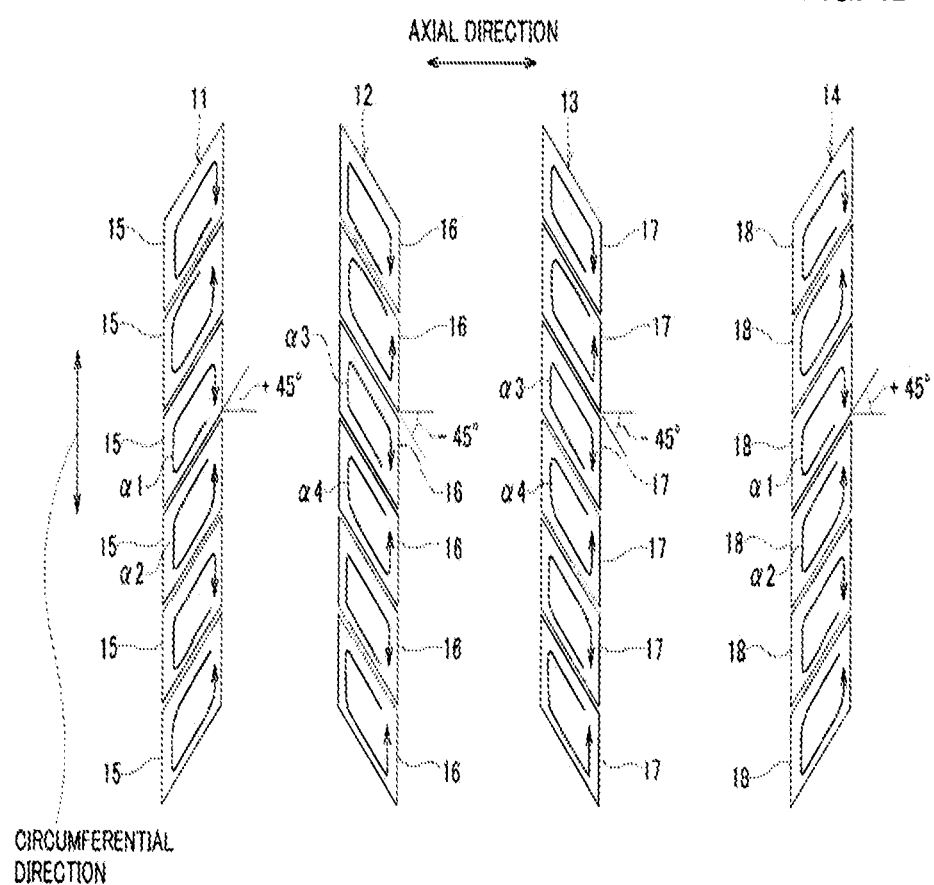
FIG. 4A to FIG. 4D illustrate a first split coil, a second split coil, a third split coil, and a fourth split coil of the detection coil of the coil unit of the first example, and are developed views of each single unit viewed from the outside in the radial direction.

FIG. 3 is a developed view of the detection coil 9 as viewed from the outside in the radial direction of the coil unit 7. FIG. 4A to FIG. 4D are developed views of the first split coil 11, the second split coil 12, the third split coil 13, and the fourth split coil 14 of the detection coil 9 as seen from the outside in the radial direction of the coil unit 7.

As illustrated in FIG. 4A, the first split coil 11 includes a plurality of coil pieces 15 arranged side by side at equal pitches in a circumferential direction. These coil pieces 15 have a parallelogram shape when viewed from the radial direction, and include wiring that is inclined +45° with respect to the axial direction of the intermediate shaft portion 6. Coil pieces 15 that are adjacent in the circumferential direction are connected in series by a conductor such as printed wiring (not illustrated).

In FIG. 4A, the coil pieces 15 are schematically illustrated, and illustrated as if the entire circumference is connected; however, actually, discontinuous portions exist in a part of the coil pieces 15 in the circumferential direction. The coil pieces 15 have two end portions that are separated across the discontinuous portion. Coil pieces 15 that are adjacent in the circumferential direction are connected in series by connecting one end of each with a conductor such as printed wiring (not illustrated). These aspects are the same for the second split coil 12 to the fourth split coil 14 below.

As illustrated in FIG. 4B, the second split coil 12 includes a plurality of coil pieces 16 arranged side by side at equal pitches in the circumferential direction. These coil pieces 16 have a parallelogram shape when viewed from the radial direction, and include wiring that is inclined −45° with respect to the axial direction of the intermediate shaft portion 6. Coil pieces 16 that are adjacent in the circumferential direction are connected in series by a conductor such as printed wiring (not illustrated).

As illustrated in FIG. 4C, the third split coil 13 includes a plurality of coil pieces 17 arranged side by side at equal pitches in the circumferential direction. These coil pieces 17 have a parallelogram shape when viewed from the radial direction, and include wiring that is inclined −45° with respect to the axial direction of the intermediate shaft portion 6. Coil pieces 17 that are adjacent in the circumferential direction are connected in series by a conductor such as printed wiring (not illustrated).

As illustrated in FIG. 4D, the fourth split coil 14 includes a plurality of coil pieces 18 arranged side by side at equal pitches in the circumferential direction. These coil pieces 18 have a parallelogram shape when viewed from the radial direction, and include wiring that is inclined +45° with respect to the axial direction of the intermediate shaft portion 6. Coil pieces 18 that are adjacent in the circumferential direction are connected in series by a conductor such as printed wiring (not illustrated).

When carrying out the present disclosure, configuration regarding the specific shape and arrangement of the first split coil, second split coil, third split coil, and fourth split coil that constitute the detection coil is not limited to the configuration of this example, and various conventionally known configurations may be adopted.

The holder 8 is made of rubber or synthetic resin, covers an outer peripheral surface of the coil unit 7, and has portions that protrude from the coil unit 7 on both sides in the axial direction. In this example, the holder 8 also covers side surfaces on both sides in the axial direction and the inner peripheral surface of the coil unit 7. That is, in this example, the holder 8 is configured in a cylindrical shape as a whole, and by entirely embedding the coil unit 7 arranged coaxially with the holder 8, the holder 8 covers the outer peripheral surface, the side surfaces on both sides in the axial direction, and the inner peripheral surface of the coil unit 7.

Note that when carrying out the present disclosure, it is also possible to employ construction in which portions of the holder 8 that cover the side surfaces on both sides in the axial direction of the coil unit 7 are omitted. That is, a configuration may also be adopted in which the holder 8 is separated into a portion of the holder 8 positioned on the outer side in the radial direction of the outer peripheral surface of the coil unit 7 and a portion of the holder 8 positioned on the inner side in the radial direction of the inner peripheral surface of the coil unit 7.

The torque sensor 4 is fixed to and supported by the casing 2 by fitting the outer peripheral surface of the holder 8 into the inner peripheral surface of the tubular portion 5 of the casing 2 with an interference fit. In this state, the coil unit 7 is arranged coaxially around the intermediate shaft portion 6 of the rotating shaft 3. When carrying out the present disclosure, the outer peripheral surface of the holder 8 can also be adhesively fixed to the inner peripheral surface of the tubular portion 5 of the casing 2.

Figure 5:
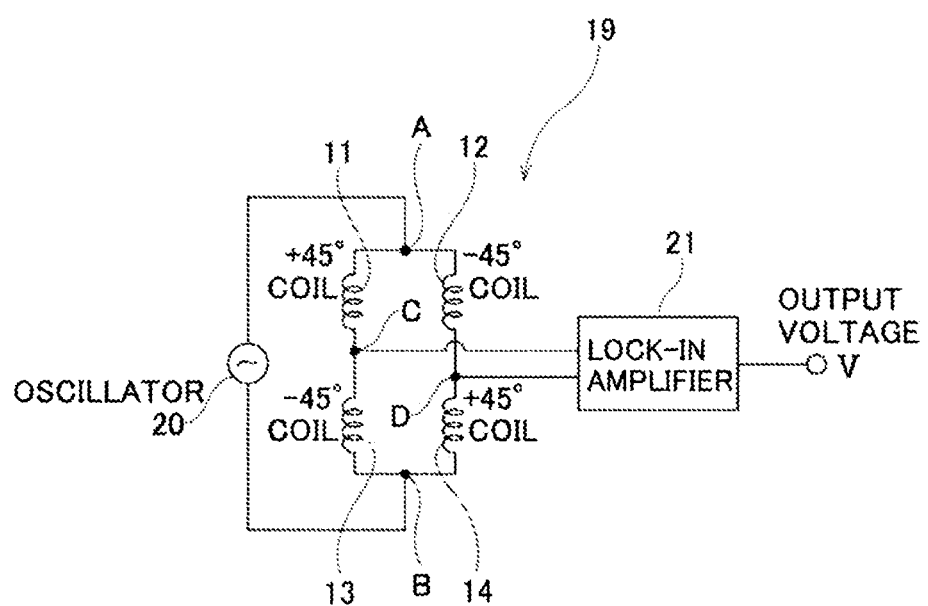
FIG. 5 is a diagram illustrating an electronic circuit of the first example.

The torque sensor 4 of this example further includes an electronic circuit 19 as illustrated in FIG. 5. The electronic circuit 19 includes the first split coil 11, the second split coil 12, the third split coil 13, and the fourth split coil 14 of the detection coil 9 (see FIG. 3), and generates an output voltage corresponding to the voltage of the detection coil 9.

In this example, the electronic circuit 19 includes a bridge circuit in which the first split coil 11, the second split coil 12, the third split coil 13, and the fourth split coil 14 are arranged on four sides of the bridge circuit. The electronic circuit 19, in addition to the first split coil 11, the second split coil 12, the third split coil 13, and the fourth split coil 14, includes an oscillator 20 for applying an AC voltage between a point A and a point B, and a lock-in amplifier 19 for detecting and amplifying a midpoint voltage (differential voltage) that is a potential difference between a point C and point D.

Of the components of the electronic circuit 19, components other than the detection coil 9 may be fixed to the flexible substrate 10 or another substrate (not illustrated), for example.

When the torque measuring device 1 of this example is used, an AC voltage is applied between the points A and B of the electronic circuit 19 by the oscillator 20, causing an alternating current to flow through the first split coil 11, the second split coil 12, the third split coil 13, and the fourth split coil 14. Then, as indicated by arrows α1, α2, α3, and α4 in FIG. 4A to FIG. 4D, in the first split coil 11, the second split coil 12, the third split coil 13, and the fourth split coil 14, currents flow in mutually opposite directions between the coil pieces 15, 16, 17, and 18 adjacent in the circumferential direction.

In other words, pairs of coil pieces 15, 16, 17, and 18 adjacent in the circumferential direction are connected to each other so that the current flows in such directions. As a result, an alternating magnetic field is generated around the first split coil 11, the second split coil 12, the third split coil 13, and the fourth split coil 14, and part of the magnetic flux of this alternating magnetic field passes through a surface layer portion of the intermediate shaft portion 6.

In this state, when a torque T in a direction indicated by arrow CW in FIG. 1 is applied to the intermediate shaft portion 6, a tensile stress (+σ) in a +45° direction with respect to the axial direction and a compressive stress (−σ) in a −45° direction with respect to the axial direction act on the rotating shaft 3. Then, due to an inverse magnetostriction effect, the magnetic permeability of the intermediate shaft portion 6 increases in the +45° direction, which is the direction in which the tensile stress (+σ) acts, and the magnetic permeability of the intermediate shaft portion 6 decreases in the −45° direction, which is the direction in which the compressive stress (−σ) acts.

On the other hand, the first split coil 11 and the fourth split coil 14 are configured to include wiring inclined +45° with respect to the axial direction of the intermediate shaft portion 6, and part of the magnetic flux of the alternating magnetic field generated around the wiring passes through the surface layer of the intermediate shaft portion 6 in the −45° direction, which is the direction in which the magnetic permeability decreases. Therefore, the inductances of the first split coil 11 and the fourth split coil 14 decrease.

Moreover, the second split coil 12 and the third split coil 13 are configured to include wiring inclined −45° with respect to the axial direction of the intermediate shaft portion 6, and part of the magnetic flux of the alternating magnetic field generated around the wiring passes through the surface layer of the intermediate shaft portion 6 in the +45° direction, which is the direction in which the magnetic permeability increases. Therefore, the inductances of the third split coil 13 and the fourth split coil 14 increase.

In contrast, when a torque T is applied to the intermediate shaft portion 6 in a direction indicated by arrow CCW in FIG. 1, due to action opposite to the case described above, the inductances of the first split coil 11 and the fourth split coil 14 increase, and the inductances of the second split coil 12 and the third split coil 13 decrease.

In either case, in the electronic circuit 19, the lock-in amplifier 21 detects and amplifies the midpoint voltage, which is the potential difference between the points C and D, and as a result, an output voltage V corresponding to the direction and magnitude of the torque T applied to the rotating shaft 3 is obtained. Therefore, the torque transmitted by the rotating shaft 3 can be measured by using this output voltage V.

In this example, when torque is measured as described above, the tubular portion 5 forming the casing 2 made of magnetic metal arranged around the coil unit 7 functions as a back yoke. As a result, leakage of magnetic flux to the outside is suppressed, the effect of disturbance is reduced, and accuracy of torque measurement can be improved.

In the torque measuring device 1 of this example, each component of the torque measuring device 1 expands or contracts due to temperature changes during use. Accordingly, a clearance C in the radial direction existing between the outer peripheral surface of the coil unit 7 and the inner peripheral surface of the tubular portion 5 that functions as the back yoke changes, and as a result the output voltage V of the electronic circuit 19 changes.

Figure 6:
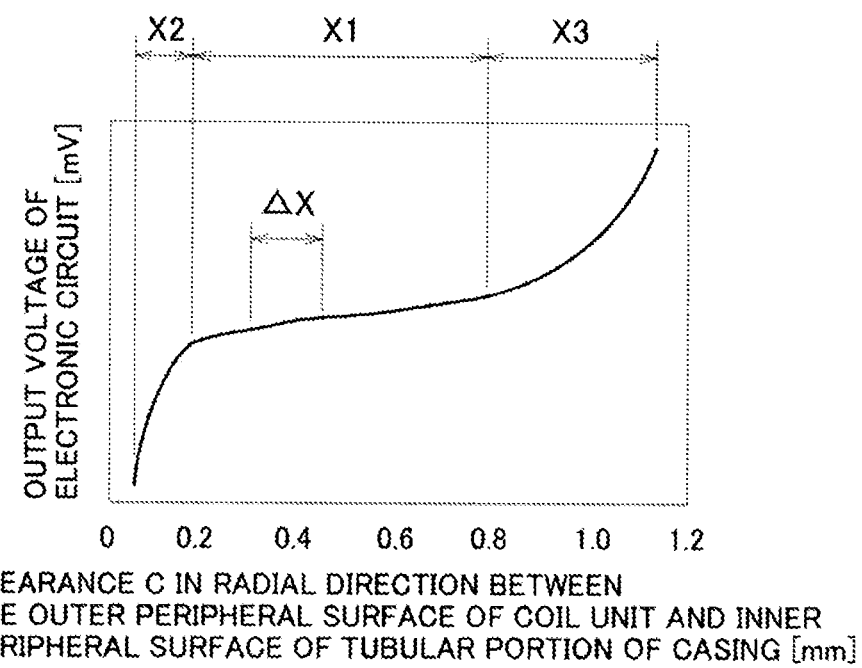
FIG. 6 is a graph conceptually illustrating a relationship between a radial clearance C between the coil unit and a back yoke and an output voltage V of the electronic circuit in the torque measuring device of the first example.

FIG. 6 is a graph conceptually illustrating a relationship between the clearance C in the radial direction and the output voltage V of the electronic circuit 19 in the torque measuring device 1 of this example Note that the graph illustrated in FIG. 6, including the numerical values on the horizontal axis, is an example. The graph illustrated in FIG. 6 can be obtained based on simulation analysis or experimentation.

As illustrated in this graph, in the range of clearance C in the radial direction, there is a range X1 in which linearity is indicated between the change in the clearance C in the radial direction and the change in the output voltage V of the electronic circuit 19, and on both sides of the range X1, there are ranges X2, X3 in which non-linearity is exhibited between the change in the clearance C in the radial direction and the change in the output voltage V of the electronic circuit 19.

That is, in the range X2 in which the clearance C in the radial direction is smaller than a predetermined value, or in the range X3 in which the clearance C in the radial direction is larger than a predetermined value, the change in the output voltage V of the electronic circuit 19 is non-linear, that is, non-linear change with respect to the change in the clearance C in the radial direction that accompanies temperature changes during use.

On the other hand, in the intermediate range X1 sandwiched between the range X2 and the range X3, the change in the output voltage V of the electronic circuit 19 is linear, that is, the change is linear with respect to the change in the clearance C in the radial direction due to the change in temperature during use.

Therefore, in the torque measuring device 1 of this example, the change range ΔX of the clearance C in the radial direction due to temperature changes during use is regulated so as to fall within the range X1 in which the change in the output voltage V of the electronic circuit 19 is linear change with respect to the change in the clearance C in the radial direction. More specifically, the clearance C in the radial direction at room temperature is set so that the change range ΔX falls within the range X1 (0.2 mm to 0.8 mm in the illustrated example).

According to the torque measuring device 1 of this example, the following effects can be obtained.

In this example, the holder 8 covers the outer peripheral surface of the coil unit 7 and includes a portion that protrudes further to both sides in the axial direction than the coil unit 7. More specifically, in this example, the outer peripheral surface and the side surfaces of both sides in the axial direction of the coil unit 7 are covered by the holder 8. Therefore, it is possible to prevent the outer peripheral surface and the side surfaces in the axial direction of the coil unit 7 from directly colliding with surrounding objects and being damaged when performing work of assembling the coil unit 7 in the casing or the like.

Furthermore, in this example, since the inner peripheral surface of the coil unit 7 is also covered by the holder 8, the inner peripheral surface of the coil unit 7 can be prevented from directly colliding surrounding objects and being damaged during assembly work.

Since the tubular portion 5 of the casing 2 can function as a back yoke, the torque sensor 4 does not have a separate back yoke as a separate component. Therefore, the number of parts can be reduced accordingly.

The change range ΔX of the clearance C in the radial direction due to the temperature change during use is regulated so that the change of the output voltage V of the electronic circuit 19 with respect to the change of the clearance C in the radial direction falls within the range X1 where the change is linear, and thus, the change in the output voltage V of the electronic circuit 19 due to the change in temperature during use can be easily corrected using the separately detected temperature.

However, when carrying out the present disclosure, the clearance C in the radial direction can also be set so that the change range ΔX overlaps the range X2 or X3. In this case, the output voltage V of the electronic circuit 19 can be corrected by a correction circuit configured in consideration of nonlinearity in the range X2 or X3.

Second Example

Figure 7:
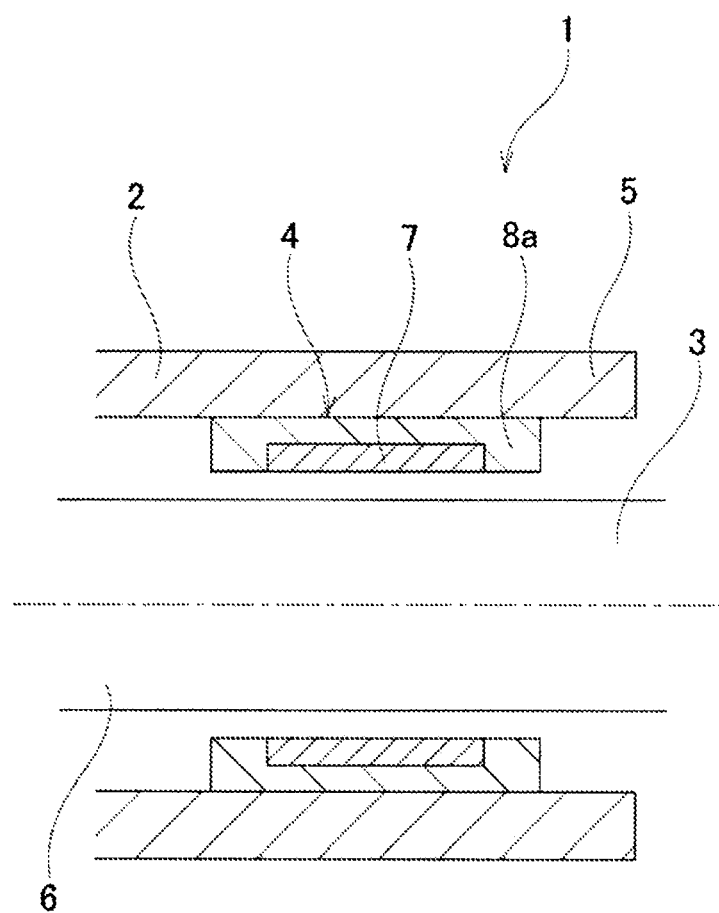
FIG. 7 is a cross-sectional view of a torque measuring device according to a second example of an embodiment of the present disclosure.

A second example of an embodiment of the present disclosure will be described with reference to FIG. 7.

In this example, a holder 8a of a torque sensor 4 covers only an outer peripheral surface and both side surfaces in the axial direction of a coil unit 7, and does not cover an inner peripheral surface of the coil unit 7. Therefore, a volume of the holder 8a can be reduced accordingly, and material cost of the holder 8a can be suppressed.

In addition, since the inner peripheral surface of the coil unit 7 can be brought closer to an outer peripheral surface of an intermediate shaft portion 6, torque detection accuracy can be improved. Other configurations and effects are the same as those of the first example.

Note that when carrying out the present disclosure, as the holder, it is also possible to employ construction in which portions of the holder 8a that cover the side surfaces on both sides in the axial direction of the coil unit 7 are omitted.

Third Example

A third example of an embodiment of the present disclosure will be described with reference to FIG. 8.

In this example, a tubular portion 5a of a casing 2 includes a circumferential groove 22 extending over the entire circumference of an inner peripheral surface of the tubular portion 5a. In this example, a size of the circumferential groove 22 is about the same size as a locking groove for locking an O-ring. A holder 8b of a torque sensor 4 is made of rubber and has a ridge 23 protruding outward in the radial direction over the entire circumference from a central portion in the axial direction.

In this example, in a state in which an outer peripheral surface of the holder 8b is fitted into the inner peripheral surface of the tubular portion 5a, the torque sensor 4 is positioned in the axial direction with respect to the tubular portion 5a by engaging the ridge 23 with the circumferential groove 22.

Figure 8:
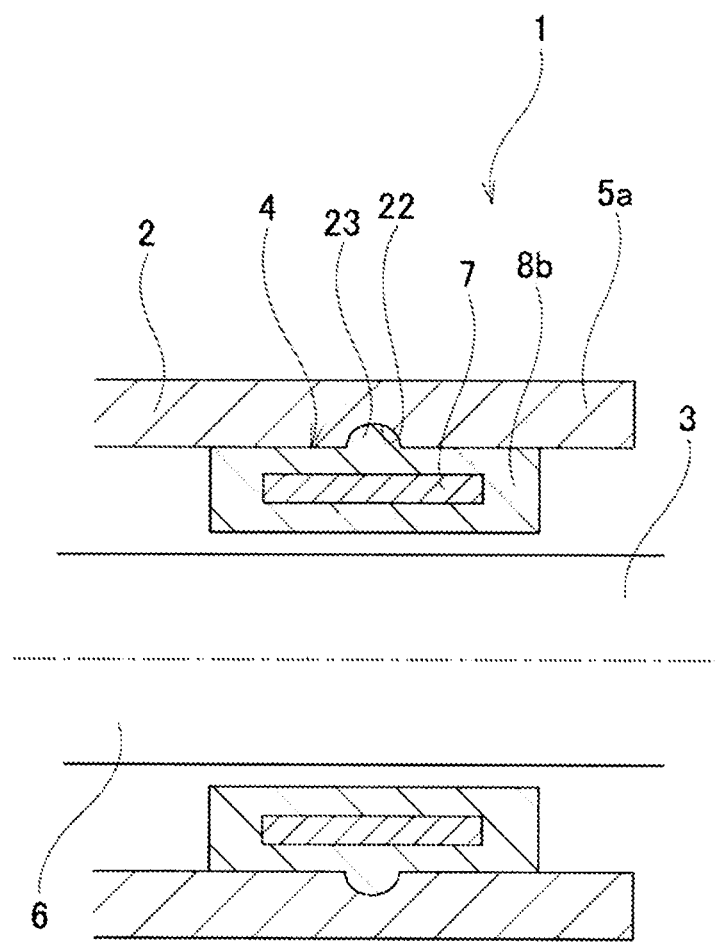
FIG. 8 is a cross-sectional view of a torque measuring device according to a third example of an embodiment of the present disclosure.

Note that in order to fit the outer peripheral surface of the holder 8b into the inner peripheral surface of the tubular portion 5a, when inserting the torque sensor 4 inside the tubular portion 5a through an opening portion of the tubular portion 5a, that is, an opening portion on the right side in FIG. 8, the ridge 23 is passed in the axial direction through a portion of the inner peripheral surface of the tubular portion 5a that is positioned between the opening portion and the circumferential groove 22 while being elastically reduced in diameter. Other configurations and effects are the same as those of the first example.

Figure 9A:
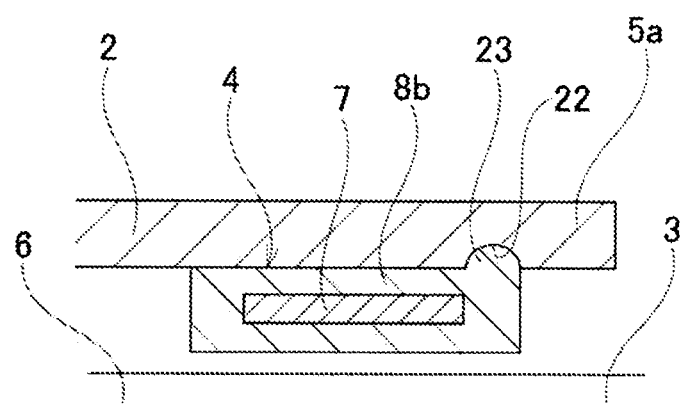
FIG. 9A and FIG. 9B are half cross-sectional views of a torque measuring device, each illustrating a modification of the third example.
Figure 9B:
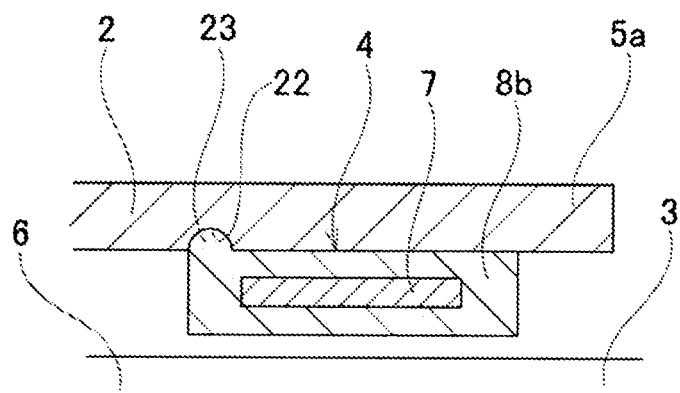

When carrying out the present disclosure, it is also possible to adopt a configuration as illustrated in FIG. 9A or FIG. 9B as a modification of the third example.

In the modification illustrated in FIG. 9A, the circumferential groove 22 and the ridge 23 that engage with each other are arranged closer to an opening portion of the tubular portion 5a than in the third example. In the modification illustrated in FIG. 9B, the circumferential groove 22 and the ridge 23 that engage with each other are arranged farther from the opening portion of the tubular portion 5a than in the third example. In particular, with the configuration of the modification illustrated in FIG. 9A, when the outer peripheral surface of the holder 8b is fitted into the inner peripheral surface of the tubular portion 5a, the distance that the torque sensor 4 is moved in the axial direction may be shortened while the diameter of the ridge 23 is elastically reduced.

Fourth Example

Figure 10:
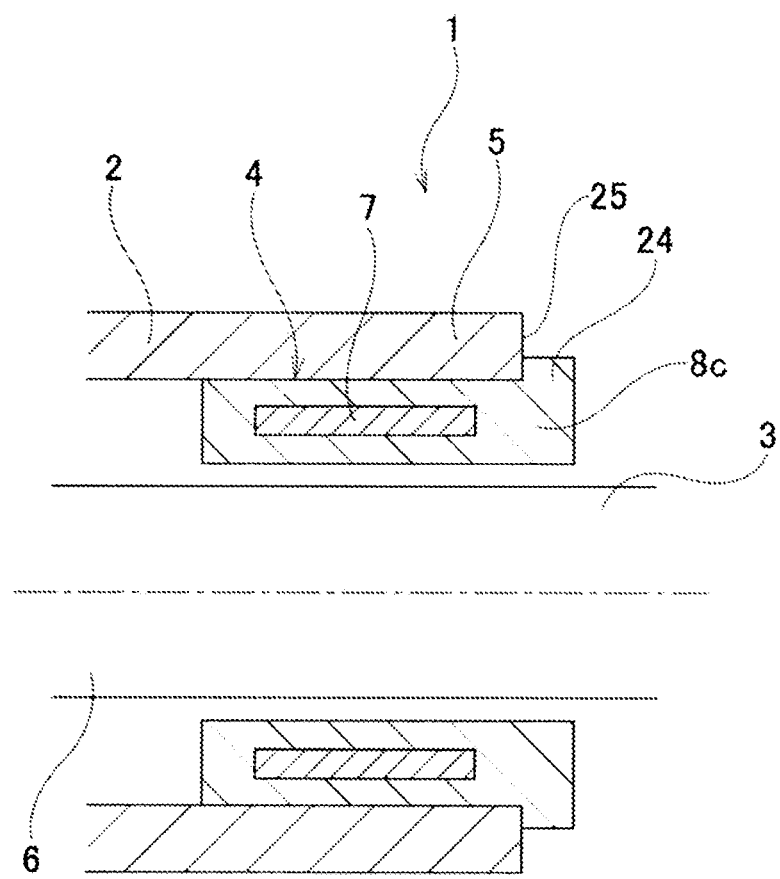
FIG. 10 is a cross-sectional view of a torque measuring device according to a fourth example of an of the present disclosure.

A fourth example of an embodiment of the present disclosure will be described with reference to FIG. 10.

In this example, a holder 8c has an outward facing flange portion 24 protruding outward in a radial direction from an end portion on one side in the axial direction (the right side in FIG. 10) over the entire circumference. In this example, in a state that an outer peripheral surface of the holder 8c is fitted into an inner peripheral surface of a tubular portion 5, the outward facing flange portion 24 is brought into contact with a side surface 25 in the axial direction of the tubular portion 5, which positions a torque sensor 4 in the axial direction with respect to the tubular portion 5. Other configurations and effects are the same as those of the first example.

Fifth Example

A fifth example of an embodiment of the present disclosure will be described with reference to FIG. 11.

In this example, a tubular portion 5b of a casing 2 has a convex portion 26 protruding inward in the radial direction from an intermediate portion in the axial direction over the entire circumference of the tubular portion 5b. A holder 8d is made of rubber and has two outward facing flange portions 24 protruding outward in the radial direction from both end portions in the axial direction over the entire circumference of the holder 8d.

In this example, in a state that an outer peripheral surface of the holder 8d is fitted into an inner peripheral surface of the convex portion 26, the convex portion 26 is sandwiched from both sides in the axial direction by the two outward facing flange portions 24. This positions the torque sensor 4 in the axial direction with respect to the tubular portion 5b and prevents the torque sensor 4 from slipping in the axial direction out of the tubular portion 5b.

Note that when performing the work of fitting the holder 8d into the inner peripheral surface of the convex portion 26, one of the two outward facing flange portions 24 is elastically reduced in diameter and is passed in the axial direction through the inner side in the radial direction of the convex portion 26. Other configurations and effects are the same as those of the first example.

Sixth Example

A sixth example of an embodiment of the present disclosure will be described with reference to FIG. 12.

In this example, a tubular portion 5c of a casing 2 has a stepped surface 27 facing a torque sensor 4 side in the axial direction at a portion of an inner peripheral surface of the tubular portion 5c adjacent to the torque sensor 4 at a side far from an opening portion of the tubular portion 5c. In a state that an outer peripheral surface of a holder 8 is fitted into the inner peripheral surface of the tubular portion 5c, the torque sensor 4 is positioned in the axial direction with respect to the tubular portion 5c by bringing the holder 8 in contact with the stepped surface 27. Other configurations and effects are the same as those of the first example.

Seventh Example

A seventh example of an embodiment of the present disclosure will be described with reference to FIG. 13.

In this example, a tubular portion 5d of a casing 2 has an annular inward facing flange portion 28 bent inward in the radial direction at an end portion on an opening side in the axial direction. In this example, a torque sensor 4 is sandwiched from both sides in the axial direction between a stepped surface 27 of the tubular portion 5d and the inward facing flange portion 28. This positions the torque sensor 4 in the axial direction with respect to the tubular portion 5b and prevents the torque sensor 4 from slipping in the axial direction out from inside the tubular portion 5d.

Figure 13:
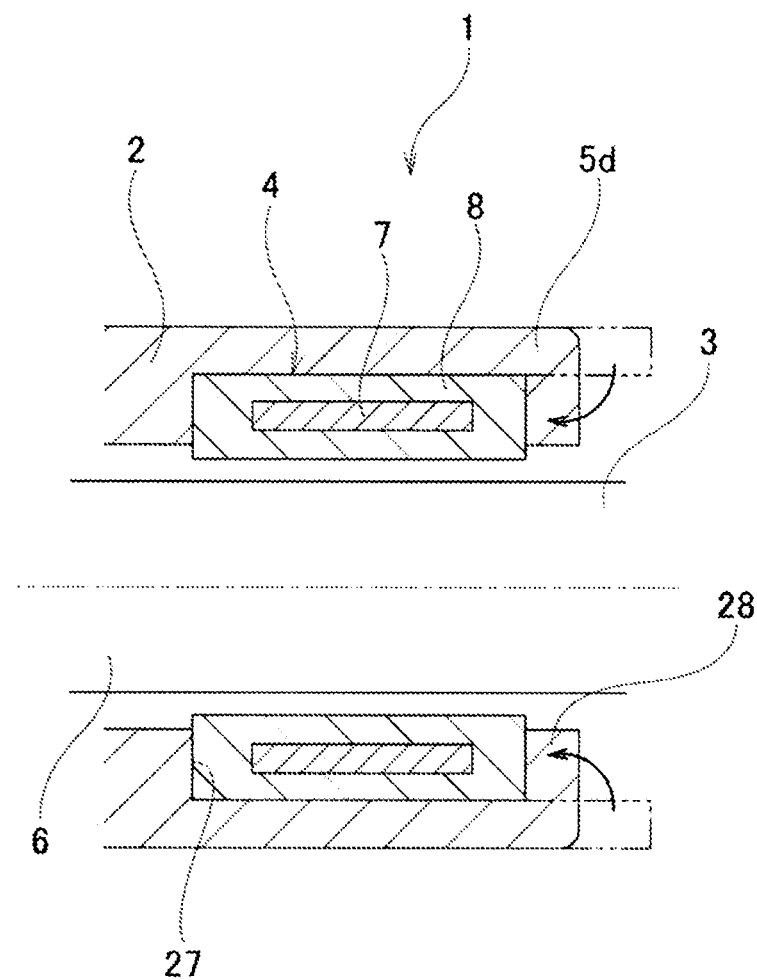
FIG. 13 is a cross-sectional view of a torque measuring device according to a seventh example of an embodiment of the present disclosure.

Note that the inward facing flange portion 28 may be formed by inserting the torque sensor 4 inside the tubular portion 5d before the inward facing flange portion 28 is formed, and then plastically deforming the end portion on the opening side of the tubular portion 5d inward in the radial direction as indicated by the arrow in FIG. 13. Other configurations and effects are the same as those of the sixth example.

The construction in the embodiments described above can be implemented in combination as appropriate within a range that does not cause contradiction.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting.

It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

REFERENCE SIGNS LIST

1 Torque measuring device
2 Casing
3 Rotating shaft
4 Torque sensor
5, 5a, 5b, 5c, 5d Tubular portion
6 Intermediate shaft portion
7 Coil unit
8, 8a, 8b, 8c, 8d Holder
9 Detection coil
10 Flexible substrate
11 First split coil
12 Second split coil
13 Third split coil
14 Fourth split coil
15 Coil piece
16 Coil piece
17 Coil piece
18 Coil piece
19 Electronic circuit
20 Oscillator
21 Lock-in amplifier
22 Circumferential groove
23 Ridge
24 Outward facing flange portion
25 Side surface in the axial direction
26 Convex portion
27 Stepped surface
28 Inward facing flange portion

The invention claimed is:

1. A torque measuring device comprising:
a casing made of a magnetic metal;
a rotating shaft rotatably arranged at an inner side of the casing and having a magnetostrictive effect section whose magnetic permeability changes according to torque to be transmitted; and
a torque sensor arranged around the magnetostrictive effect section and supported by the casing;
the torque sensor comprising: a coil unit formed in a cylindrical shape using a flexible substrate having a detection coil that changes voltage in response to changes in the magnetic permeability of the magnetostrictive effect section, and a holder made of rubber or synthetic resin, covering an outer peripheral surface of the coil unit, and having a portion that protrudes from the coil unit on both sides in an axial direction; and the torque sensor supported by the casing with an outer peripheral surface of the holder fitted into an inner peripheral surface of the casing.

2. The torque measuring device according to claim 1, wherein the holder includes portions covering sides surfaces on both sides in the axial direction of the coil unit.

3. The torque measuring device according to claim 1, wherein the coil unit is entirely embedded in the holder.

4. The torque measuring device according to claim 1, wherein a ridge provided on the outer peripheral surface of the holder is engaged with a circumferential groove provided on the inner peripheral surface of the casing.

5. The torque measuring device according to claim 1, wherein an outward facing flange portion provided on the holder abuts against a side surface in the axial direction of the casing.

6. The torque measuring device according to claim 1, wherein a portion of the casing is sandwiched from both sides in the axial direction by two outward facing flange portions provided on the holder.

7. The torque measuring device according to claim 1, wherein the holder abuts against a stepped surface facing in the axial direction and provided on the inner peripheral surface of the casing.

8. The torque measuring device according to claim 1, wherein the holder is sandwiched from both sides in the axial direction between a stepped surface facing in the axial direction and provided on the inner peripheral surface of the casing and an inward facing flange portion provided on the casing.

* * * * *